United States Patent
Oshima et al.

(10) Patent No.: US 10,819,167 B2
(45) Date of Patent: Oct. 27, 2020

(54) WIRELESS POWER RECEPTION DEVICE AND WIRELESS POWER TRANSMISSION SYSTEM

(71) Applicant: TDK CORPORATION, Tokyo (JP)

(72) Inventors: Kazunori Oshima, Tokyo (JP); Ryo Miyazawa, Tokyo (JP); Kenji Furukawa, Tokyo (JP); Shinya Ofuji, Tokyo (JP)

(73) Assignee: TDK CORPORATION, Tokyo (JP)

(*) Notice: Subject to any disclaimer, the term of this patent is extended or adjusted under 35 U.S.C. 154(b) by 36 days.

(21) Appl. No.: 16/359,967

(22) Filed: Mar. 20, 2019

(65) Prior Publication Data

US 2019/0305612 A1    Oct. 3, 2019

(30) Foreign Application Priority Data

Mar. 30, 2018  (JP) .................. 2018-070111

(51) Int. Cl.
| | |
|---|---|
| *H02J 50/12* | (2016.01) |
| *H02J 50/90* | (2016.01) |
| *B60L 53/12* | (2019.01) |
| *H02J 7/02* | (2016.01) |

(52) U.S. Cl.
CPC .............. *H02J 50/90* (2016.02); *H02J 50/12* (2016.02); *B60L 53/12* (2019.02); *H02J 7/025* (2013.01)

(58) Field of Classification Search
CPC . B60L 53/12; B60L 53/62; H02J 7/025; H02J 50/10; H02J 50/12; H02J 50/90
USPC ........................................................ 307/104
See application file for complete search history.

(56) References Cited

U.S. PATENT DOCUMENTS

| | | | | |
|---|---|---|---|---|
| 2009/0009006 | A1* | 1/2009 | Jin | H02J 7/00 307/104 |
| 2014/0257614 | A1* | 9/2014 | Niizuma | H02J 50/12 701/22 |
| 2016/0114687 | A1* | 4/2016 | Ichikawa | H01F 38/14 701/22 |
| 2017/0346346 | A1* | 11/2017 | Shimokawa | H03L 7/085 |

FOREIGN PATENT DOCUMENTS

| | | |
|---|---|---|
| CA | 3 024 826 A1 | 11/2017 |
| WO | 2017/199374 A1 | 11/2017 |

\* cited by examiner

*Primary Examiner* — William Hernandez
(74) *Attorney, Agent, or Firm* — Oliff PLC (57) ABSTRACT

A wireless power reception device detects a power receiving coil position relative to a power transmitting coil while curbing an increase in power loss. The wireless power reception device includes: a power receiving coil magnetically coupled to the power transmitting coil; a first rectification and smoothing circuit rectifying an AC voltage supplied from the power receiving coil and outputs the rectified AC voltage to a load; first and second capacitors respectively connected to first and second transmission lines; a first resistor having one terminal connected to the first capacitor and the other terminal is supplied with a predetermined reference potential; a second resistor having one terminal connected to the second capacitor and the other terminal is supplied with the reference potential; and a position detecting circuit detecting the power receiving coil position relative to the power transmitting coil on the basis of first and second junction point potentials.

20 Claims, 3 Drawing Sheets

FIG. 3

WIRELESS POWER RECEPTION DEVICE AND WIRELESS POWER TRANSMISSION SYSTEM

BACKGROUND OF THE INVENTION

Field of the Invention

The present invention relates to a wireless power reception device and a wireless power transmission system.

Priority is claimed on Japanese Patent Application No. 2018-070111, filed Mar. 30, 2018, the content of which is incorporated herein by reference.

Description of Related Art

Technology associated with wireless power transmission which is transmission of electric power in a wireless manner has been studied and developed.

In this regard, a noncontact power supply system that detects a coil position on the basis of an AC voltage which is detected in a stage previous to a rectifier circuit when a relay circuit disposed between the rectifier circuit that rectifies AC power received by a power receiving coil and a drive circuit that is connected to the rectifier circuit and a battery is turned on and detects the coil position on the basis of a DC voltage which is detected in a stage subsequent to the rectifier circuit when the relay circuit is turned off is known as a noncontact power supply system that supplies electric power from a ground-side power transmitting coil to a vehicle-side power receiving coil (see Patent Document 1).

PATENT DOCUMENTS

[Patent Document 1] PCT International Publication No. 2017/199374

SUMMARY OF THE INVENTION

Here, in such a noncontact power supply system, a voltage divider circuit for detecting an AC voltage is required for a stage previous to the rectifier circuit. As a result, in the noncontact power supply system, power loss due to the voltage, divider circuit may occur at the time of main supply of power.

The invention was made in consideration of the above-mentioned circumstances and an objective thereof is to provide a wireless power reception device and a wireless power transmission system that can detect a position of a power receiving coil relative to a power transmitting coil while curbing an increase in power loss.

According to an aspect of the invention, there is provided a wireless power reception device that receives AC power from a power transmitting coil of a wireless power transmission device, the wireless power reception device including: a power receiving coil that is magnetically coupled to the power transmitting coil; a first rectification and smoothing circuit that rectifies an AC voltage supplied from the power receiving coil and outputs the rectified AC voltage to a load; a first capacitor that is connected to a first transmission line which is one of two transmission lines connecting the power receiving coil and the first rectification and smoothing circuit; a second capacitor that is connected to a second transmission line other than the first transmission line of the two transmission lines; a first resistor of which one terminal is connected to the first capacitor and the other terminal is supplied with a predetermined reference potential; a second resistor of which one terminal is connected to the second capacitor and the other terminal is supplied with the reference potential; and a position detecting circuit that detects a position of the power receiving coil relative to the power transmitting coil on the basis of a potential of a first junction point which is a junction point between the first capacitor and the first resistor and a potential of a second junction point which is a junction point between the second capacitor and the second resistor.

According to the aspect of the invention, it is possible to detect a position of a power receiving coil relative to a power transmitting coil while curbing an increase in power loss.

DETAILED DESCRIPTION OF THE INVENTION

Embodiment

Hereinafter, an embodiment of the invention will be described with reference to the accompanying drawings. In this embodiment, transmission of power in a wireless manner is referred to as wireless power transmission for the purpose of convenience of description. In this embodiment, a conductor that transmits an, electrical signal based on DC power or an electrical signal based on AC power is referred to as a transmission line. A transmission line is, for example, a conductor which is printed on a board. A transmission line may be a wire which is a conductor formed in a line shape or the like instead of a conductor.

<Outline of Wireless Power Transmission System>

Figure 1:
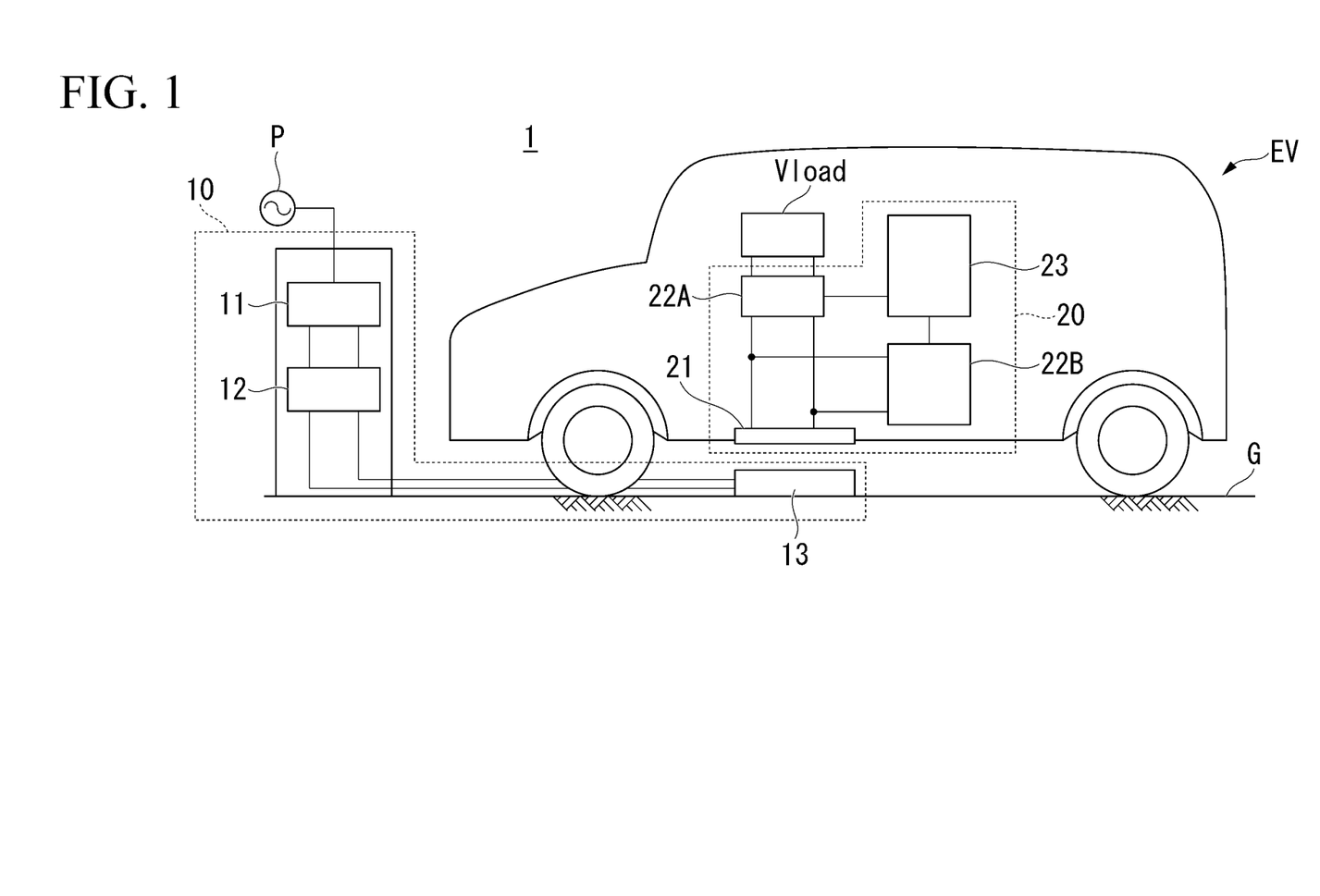
FIG. 1 is a diagram illustrating an example of a configuration of a wireless power transmission system 1 according to an embodiment.

First, the outline of a wireless power transmission system 1 according to the embodiment will be described below. FIG. 1 is a diagram illustrating an example of the configuration of the wireless power transmission system 1 according to the embodiment.

The wireless power transmission system 1 includes a wireless power transmission device 10 and a wireless power reception device 20.

In the wireless power transmission system 1, power is transmitted from the wireless power transmission device 10 to the wireless power reception device 20 by wireless power transmission. More specifically, in the wireless power transmission system 1, power is transmitted from a power transmitting coil L1 (not illustrated in FIG. 1) of the wireless power transmission device 10 to a power receiving coil L2 (not illustrated in FIG. 1) of the wireless power reception device 20 by wireless power transmission. The wireless power transmission system 1 performs wireless power transmission, for example, using a magnetic field resonance system. The wireless power transmission system 1 may be configured to perform wireless power transmission using another system instead of the magnetic field resonance system.

In the following description, it is assumed that the wireless power transmission system 1 is applied to a system that performs charging of a battery (a secondary battery) mounted in an electric vehicle EV using wireless power transmission as illustrated in FIG. 1. An electric vehicle EV is a motor-driven vehicle (a moving object) that travels b driving a motor using power charged in the battery. In the example illustrated in FIG. 1, the wireless power transmission system 1 includes the wireless pow transmission device 10 which is installed on a ground surface G on a charging facility side and the wireless power reception device 20 which is mounted in an electric vehicle EV. The wireless power transmission system 1 may be configured to be applied to another device, another system, or the like instead of the configuration in which it is applied to the above-mentioned system.

In wireless power transmission using a magnetic field resonance system, the wireless power transmission system 1 causes resonance frequencies of a transmission-side resonance circuit (which is included in a power transmitting coil unit 13 which will be described later in the example illustrated in FIG. 1) which is included in the wireless power transmission device 10 and a reception-side resonance circuit (which is included in a power receiving coil unit 21 which will be described later in the example illustrated in FIG. 1) which is included in the wireless power reception device 20 to approach each other (or causes the resonance frequencies to match each other), applies high-frequency current and voltage in the vicinity of the resonance frequency to a power transmitting coil unit 13, and wirelessly transmits (supplies) power to a power receiving coil unit 21 which is electromagnetically resonated.

Accordingly, the wireless power transmission system 1 according to this embodiment can transmit power supplied from a charging facility side to an electric vehicle EV in a wireless manner and charge a battery mounted in the electric vehicle EV using wireless power transmission without connection using a charging cable.

However, it is known that, when a position of the wireless power reception device 20 relative to the wireless power transmission device 10 deviates from a predetermined position, that is, when, a position of a power receiving coil L2 relative to a power transmitting coil L1 deviates from a predetermined position, a transmission efficiency of wireless power transmission from the power transmitting coil unit 13 to the power receiving coil unit 21 decreases. A transmission efficiency is represented, for example, by an amount of power transmitted per unit time by wireless power transmission. Instead, a transmission efficiency may be represented by another amount based on wireless power transmission.

In the wireless power transmission system 1, in order to curb a decrease in transmission efficiency of such wireless power transmission, the wireless power reception device 20 detects a position of the wireless power reception device 20 relative to the wireless power transmission device 10, that is, a position of the power receiving coil L2 relative to the power transmitting coil L1.

Specifically, in the wireless power transmission system 1 when information indicating that detection of the position of the power receiving coil L2 relative to the power transmitting coil L1 is started is acquired from the wireless power reception device 20, the wireless power transmission device 10 starts transmission of weak power from the power transmitting coil L1 to the power receiving coil L2. For example, the wireless power transmission device 10 acquires the information from the wireless power reception device 20 by wireless communication based on a standard such as Wi-Fi (registered trademark).

Here, weak power is power which is required for the wireless power reception device 20 to detect a position of the power receiving coil L2 relative to the power transmitting coil L1. Weak power is power which is lower (weaker) than normal power. Normal power is power which is transmitted from the wireless power transmission device 10 to the wireless, power reception device 20 by wireless power transmission when a battery (a secondary battery) mounted in an electric vehicle EV is charged by wireless power transmission. For example, weak power is power corresponding to about 1% to 10% of normal power. Weak power may be power which is less than 1% of normal power or may be power which is greater than 10% of normal power. The wireless power transmission device 10 may be configured to start transmission of weak power to the wireless power reception device 20 using another method.

When weak power is received, the wireless power reception device 20 detects a position of the power receiving coil L2 relative to the power transmitting coil L1 on the basis of the received weak power. The wireless power reception device 20 performs an operation based on the detected position. For example, the wireless power reception device 20 waits until the position matches a predetermined position. When it is determined that the position matches the predetermined position, the wireless power reception device 20 outputs information indicating that the position matches the predetermined position to the wireless power transmission device 10 by the wireless communication. When the information is acquired, the wireless power transmission device 10 transmits normal power to the wireless power reception device 20 by wireless power transmission.

<Configuration of Wireless Power Transmission System>

The configuration of the wireless power transmission system 1 will be described below with reference to FIG. 1.

The wireless power transmission device 10 includes a conversion circuit 11, a power transmitting circuit 12, and a power transmitting coil unit 13. On the other hand, the wireless power reception device 20 includes a power receiving coil unit 21, a first circuit 22A, a second circuit 22B, and a control circuit 23. The wireless power reception device 20 can be connected to a load Vload. In the example illustrated in FIG. 1, the wireless power reception, device 20 is connected to the load Vload. The wireless power reception device 20 may include the load Vload.

The conversion circuit 11 is, for example, an alternating current/direct current (AC/DC) converter that is connected to an external commercial power supply P and converts an AC voltage input from the commercial power supply P into a desired DC voltage. The conversion circuit 11 is connected to the power transmitting circuit 12. The conversion circuit 11 supplies the DC voltage into which the AC voltage is converted to the power transmitting circuit 12.

The conversion circuit 11 is not particularly limited as long as it can output a DC voltage to the power transmitting circuit 12. For example, the conversion circuit 11 may be a conversion circuit in which a rectification and smoothing circuit that rectifies an AC voltage and converts the AC voltage into a DC voltage and a power factor correction (PFC) circuit that performs power factor correction are combined, may be a conversion circuit in which the rectification and smoothing circuit and a switching circuit such as a switching converter are combined, or may be another conversion circuit that outputs a DC voltage to the power transmitting circuit 12.

The power transmitting circuit 12 serves to convert a DC voltage supplied from the conversion circuit 11 into an AC voltage. For example, the power transmitting circuit 12 includes a switching circuit in which a plurality of switching elements are bridge-connected. The power transmitting circuit 12 is connected to the power transmitting coil unit 13. The power transmitting circuit 12 supplies an AC voltage, a drive frequency of which has been controlled on the basis of a resonance frequency of the power transmitting coil unit 13, to the power transmitting coil unit 13.

The power transmitting coil unit 13 includes, for example, an LC resonance circuit including a capacitor which is not illustrated in FIG. 1 along with the power transmitting coil L1 which is not illustrated in FIG. 1 as a transmission-side resonance circuit. In this case, the power transmitting coil unit 13 can adjust the resonance frequency of the transmission-side resonance circuit by adjusting a capacitance of the capacitor. The wireless power transmission device 10 causes the resonance frequency of the transmission-side resonance circuit to approach (or match) a resonance frequency of a reception-side resonance circuit of the power receiving coil unit 21 and performs wireless power transmission using a magnetic field resonance system. The capacitor may be constituted, for example, by a capacitor connected in series to the power transmitting coil L1, may be constituted by a capacitor connected in series to the power transmitting coil L1 and a capacitor connected in parallel to the power transmitting coil L1, or may be constituted in another configuration. In the following description, it is assumed that the capacitor is a capacitor connected in series to the power transmitting coil L1. The power transmitting coil unit 13 may include another resonance circuit including the power transmitting coil L1 as the transmission-side resonance circuit instead of the LC resonance circuit. The power transmitting coil unit 13 may include another circuit or another circuit element in addition to the transmission-side resonance circuit. The power transmitting coil unit 13 may include a magnetic material that enhances magnetic coupling between the power transmitting coil L1 and the power receiving coil L2 or an electromagnetic shield that curbs leakage of a magnetic field generated by the power transmitting coil L1 to the outside.

The power transmitting coil L1 is, for example, a coil for wireless power transmission which is obtained by winding a litz wire formed of copper or aluminum in a spiral shape. The power transmitting coil L1 in this embodiment is installed on the ground surface G or is buried in the ground surface G such that it faces the bottom of the floor of the electric vehicle EV. In the following description, for example, it is assumed that the power transmitting oil L1 (that is, the power transmitting coil unit 13) is installed on the ground surface G along with the power transmitting circuit 12.

The power receiving coil unit 21 includes, for example, an LC resonance circuit including a capacitor which is not illustrated in FIG. 1 along with the power receiving coil L2 which is not illustrated in FIG. 1 as the reception-side resonance circuit. In this case, the power receiving coil unit 21 can adjust the resonance frequency of the reception-side resonance circuit by adjusting a capacitance of the capacitor. The wireless power reception device 20 performs wireless power transmission using a magnetic field resonance system by causing the resonance frequency of the reception-side resonance circuit to approach (or match) the resonance frequency of the transmission-side resonance circuit. The capacitor may be constituted, for example, by a capacitor connected in series to the power receiving coil L2, may be constituted by a capacitor connected in series to the power receiving coil L2 and a capacitor connected in parallel to the power receiving coil L2, or may be constituted in another configuration. In the following description, it is assumed that the capacitor is a capacitor connected in series to the power receiving coil L2. The power receiving coil unit 21 may include another resonance circuit including the power receiving coil L2 as the reception-side resonance circuit instead of the LC resonance circuit. The power receiving coil unit 21 may include another circuit or another circuit element in addition to the reception-side resonance circuit. The power receiving coil unit 21 may include a magnetic material that enhances magnetic coupling between the power transmitting coil L1 and the power receiving coil L2 or an electromagnetic shield that curbs leakage of a magnetic field generated by the power receiving coil L2 to the outside.

The first circuit 22A is connected to the power receiving coil unit 21 and serves to rectify an AC voltage supplied from the power receiving coil L2 and to convert the AC voltage into a DC voltage. The first circuit 22A can be connected to a load Vload. In, the example illustrated in FIG. 1, the first circuit 22A is connected to the load Vload. When the first circuit 22A is connected to the load Vload, the first circuit 22A supplies the converted DC voltage to the load Vload. In the wireless power reception device 20, the first circuit 22A may be connected to the load Vload via a charging circuit when it is connected to the load Vload.

When the load Vload is connected to the first circuit 22A, the load Vload is supplied with a DC voltage from the first circuit 22A. For example, the load Vload is a battery mounted in the electric vehicle EV or a motor mounted in the electric vehicle EV. The load Vload is a resistive load of which an equivalent resistance value varies over time depending on demand conditions (storage conditions or consumption conditions) of power. In the wireless power reception device 20, the load Vload may be another load which is supplied with a DC voltage from the first circuit 22A instead of the battery or the motor.

The second circuit 22B is connected to the power receiving coil unit 1 in parallel to the first circuit 22A. When a weak voltage is generated in the power receiving coil L2, the second circuit 22B detects a position of the power receiving coil L2 relative to the power transmitting coil L1 on the basis of the weak voltage supplied from the power receiving coil L2. The second circuit 22B outputs an electrical signal indicating the detected position to the control circuit 23.

The control circuit 23 controls the wireless power reception device 20. For example, the control circuit 23 transmits and receives a variety of information to and from the wireless power transmission device 10.

When an electrical signal indicating a position of the power receiving coil L2 relative to the power transmitting coil L1 is acquired from the second circuit 22B, the control circuit 23 determines whether the position indicated by the electrical signal has matched a predetermined position. When it is determined that the position of the power receiving coil L2 relative to the power transmitting coil L1 has matched the predetermined position, the control circuit 23 outputs information indicating that the position of the power receiving coil L2 relative to the power transmitting coil L1 has matched the predetermined position to the wireless power transmission device 10 by wireless communication. Here, when the position of the power receiving coil L2 relative to the power transmitting coil L1 is included in a predetermined range, the control circuit 23 determines that the position of the power receiving coil L2 relative to the power transmitting coil L1 has matched the predetermined position. The control circuit 23 may be configured to determine that the position of the power receiving coil L2 relative to the power transmitting coil L1 has matched the predetermined position using another method. Some or all of the functions of the control circuit 23 may be provided in an electronic control circuit (ECU) of the electric vehicle EV.

<Configuration of Wireless Power Reception Device>

Figure 2:
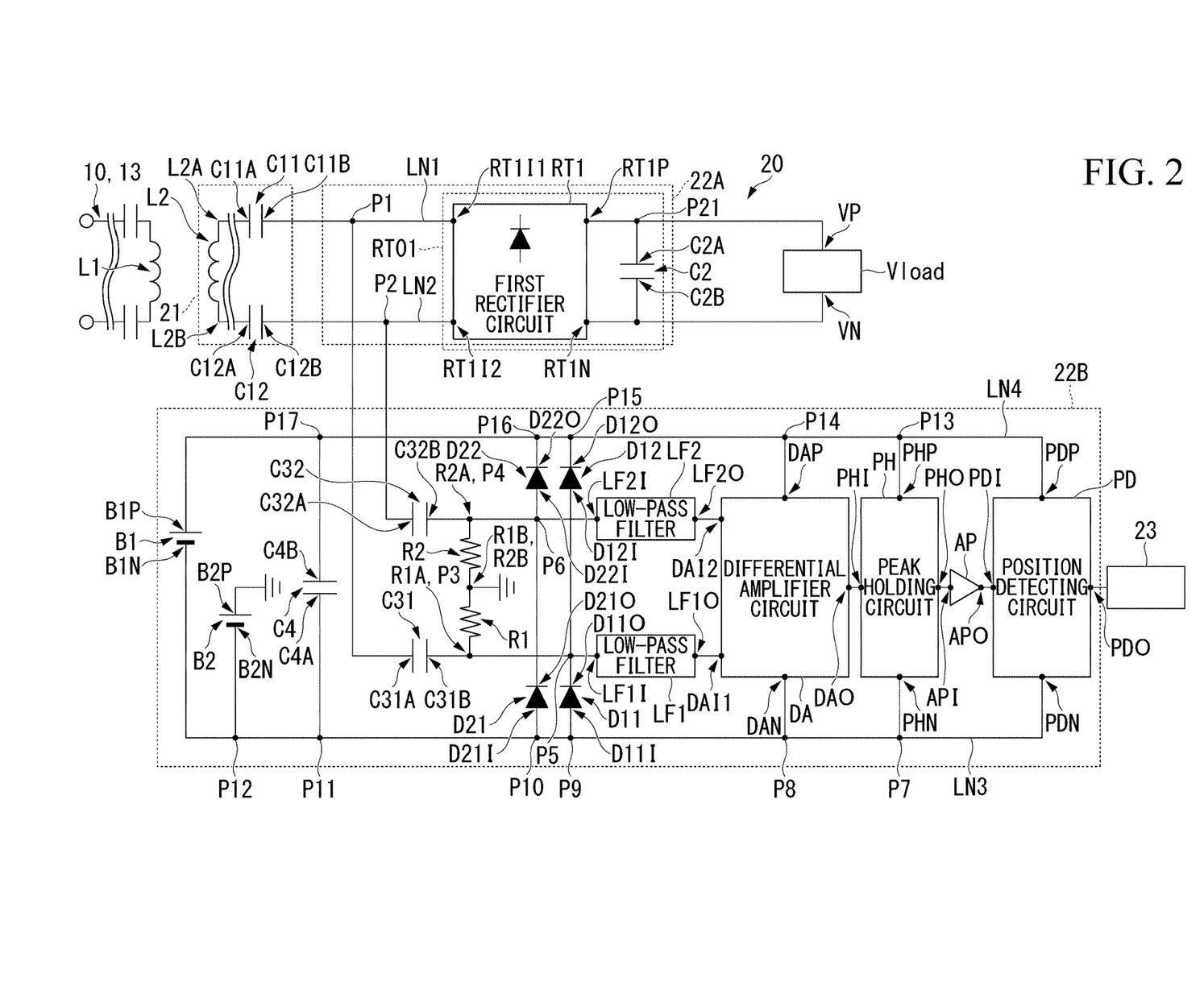
FIG. 2 is a diagram illustrating an example of a configuration of a wireless power reception device 20.

The configuration of the wireless power reception device 20 will be described below with reference to FIG. 2. FIG. 2 is a diagram illustrating an example of the configuration of the wireless power reception device 20. In the following description, for example, it is assumed that a load Vload is connected to the wireless power reception device 20.

The wireless power reception device 20 includes the power receiving coil unit 21, the first circuit 22A, the second circuit 22B, and the control circuit 23 as described above.

The power receiving coil unit 21 includes a capacitor C11 and a capacitor C12 as the capacitor of the reception-side resonance circuit.

The capacitor C11 includes two terminals: a terminal C11A and a terminal C11B. The capacitor C12 includes two terminals: a terminal C12A and a terminal C12B.

The first circuit 22A includes, for example, a first rectifier circuit RT1 and a capacitor C2 as a first rectification and smoothing circuit RT01. The first circuit 22A may include another circuit element in addition to the first rectification and smoothing circuit RT01. The first rectification and smoothing circuit RT01 may include another circuit element in addition to the first rectifier circuit RT1 and the capacitor C2.

The first rectifier circuit RT1 includes four terminals: an input terminal RT1I1, an input terminal RT1I2, a plus output terminal RT1P, and a minus output terminal RT1N. The capacitor C2 includes two terminals: a terminal C2A and a terminal C2B.

On the other hand, the second circuit 22B includes a capacitor C31, a capacitor C32, a capacitor C4, a first resistor R1, a second resistor R2, a low-pass filter LF1, a low-pass filter LF2, a power supply B1, a power supply B2, a differential amplifier circuit DA, a peak holding circuit PH, an amplifier AP, a position detecting circuit PD, a diode D11, a diode D12, a diode D21, and a diode D22.

The capacitor C31 includes two terminals: a terminal C31A and a terminal C31B. The capacitor C32 includes two terminals: a terminal C32A and a terminal C32B. The capacitor C4 includes two terminals: a terminal C4A and a terminal C4B. The first resistor R1 includes two terminals: a terminal R1A and a terminal R1B. The second resistor R2 includes two terminals: a terminal R2A and a terminal R2B. The low-pass filter LF1 includes two terminals: a signal input terminal LF1I and a signal output terminal LF1O. The low-pass filter LF2 includes two terminals: a signal input terminal LF2I and a signal output terminal LF2O. The power supply B1 includes two terminals: a plus terminal B1P and a minus terminal B1N. The power supply B2 includes two terminals: a plus terminal B2P and a minus terminal B2N.

The differential amplifier circuit DA includes five terminals: a first signal input terminal DAI1 (for example, a non-inverted input terminal), a second signal input terminal DAI2 (for example, an inverted input terminal), a plus power supply terminal DAP, a minus power supply terminal DAN, and a signal output terminal DAO. The peak holding circuit PH includes four terminals: a signal input terminal PHI, a plus power supply terminal PHP, a minus power supply terminal PHN, and a signal output terminal PHO. The amplifier AP includes four terminals: a signal input terminal API, a signal output terminal APO, and plus and minus power supply terminals which are not illustrated. The position detecting circuit PD includes four terminals: a signal input terminal PDI, a plus power supply terminal PDP, a minus power supply terminal PDN, and a signal output terminal PDO.

The diode D11 includes two terminals: an anode terminal D11I and a cathode terminal D11O. The diode D12 includes two terminals: an anode terminal D12I and a cathode terminal D12O. The diode D21 includes two terminals: an anode terminal D21I and a cathode terminal D21O. The diode D22 includes two terminals: an anode terminal D22I and a cathode terminal D22O.

The above-mentioned power receiving coil L2 includes two terminals: a terminal L2A and a terminal L2B. The above-mentioned load Vload includes two terminals: a plus power supply terminal VP and a minus power supply terminal VN.

Connection patterns between elements in the first circuit 22A and the second circuit 22B will be described below.

In the wireless power reception device 20, the terminal L2A of the power receiving coil L2 and the terminal C11A of the capacitor C11 are connected to each other by a transmission line. In the wireless power reception device 20, the terminal C11B of the capacitor C11 and the input terminal RT1I1 of the first rectifier circuit RT1 are connected to each other by a transmission line LN1. The transmission line LN1 is an example of a first transmission line.

In the wireless power reception device 20, the terminal L2B of the power receiving coil L2 and the terminal C12A of the capacitor C12 are connected to each other by a transmission line. In the wireless power reception device 20, the terminal C12B of the capacitor C12 and the input, terminal RT1I2 of the first rectifier circuit RT1 are connected to each other by a transmission line LN2. The transmission line LN2 is an example of a second transmission line.

In the wireless power reception device 20, the capacitor C2 and the load Vload are connected in parallel between the output terminal RT1P and the output terminal RT1N of the first rectifier circuit RT1 by a transmission line. That is, the terminal C2A of the capacitor C2 and the power supply terminal VP of the load Vload are connected to the output terminal RT1P of the first rectifier circuit RT1 by a transmission line. The terminal C2B of the capacitor C2 and the power supply terminal VN of the load Vload are connected to the output terminal RT1N of the first rectifier circuit RT1 by a transmission line. The capacitor C2 is a smoothing capacitor that smooths ripples of a DC voltage which is supplied from the first rectifier circuit RT1 to the load Vload.

In the transmission line LN1, a junction point P1 is provided between the capacitor C11 and the first rectifier circuit RT1 in the transmission line between the power receiving coil L2 and the first rectifier circuit RT1. In the transmission line LN2, a junction point P2 is provided between the capacitor C12 and the first rectifier circuit RT1 in the transmission line between the power receiving coil L2 and the first rectifier circuit RT1.

In the wireless power reception device 20, the terminal C31A of the capacitor C31 is connected to the junction point P1 by a transmission line. In the wireless power reception device 20, the terminal C31B of the capacitor C31 is connected to the terminal R1A of the first resistor R1 by a transmission line. The capacitor C31 is a coupling capacitor which is provided between the transmission line LN1 and the differential amplifier circuit DA (that is, between the first circuit 22A and the second circuit 22B). A reference potential which is a potential serving as a predetermined reference is applied to the terminal R1B of the first resistor R1. In the example illustrated in FIG. 2, the terminal R1B is connected to the terminal B2P of the power supply B2. Here, the power supply B2 may be any power supply (or a power supply circuit) as long as it is a DC power supply (or a power supply circuit) that supplies a DC voltage. In the following description, for example, it is assumed that the reference potential applied to the terminal R1B from the power supply B2 is 2.5 V. The reference potential may be a potential lower than 2.5 V or may be a potential higher than 2.5 V.

In the transmission line connecting the capacitor C31 and the first resistor R1, a junction point P3 is provided between the capacitor C31 and the first resistor R1. In the wireless power reception device 20, the junction point P3 is connected to the signal input terminal LF1I of the low-pass filter LF1 by a transmission line. In the wireless power reception device 20, the signal output terminal LF1O of the low-pass filter LF1 is connected to the signal input terminal DAI1 of the differential amplifier circuit DA by a transmission line. The low-pass filter LF1 is a filter that removes high-frequency noise of an electrical signal which is transmitted from the power receiving coil L2 via the transmission line LN1. The junction point P3 is an example of a first junction point.

In the wireless power reception device 20, the terminal C32A of the capacitor C32 is connected to the junction point P2 by a transmission line. In the wireless power reception device 20, the terminal C32B of the capacitor C32 is connected to the terminal R2A of the second resistor R2 by a transmission line. The capacitor C32 is a coupling capacitor that is provided between the transmission line LN2 and the differential amplifier circuit DA (that is, between the first circuit 22A and the second circuit 22B). The reference potential is applied to the terminal R2B of the second resistor R2. In the example illustrated in FIG. 2, the terminal R2B is connected to the terminal B2P of the power supply B2 along with the terminal R1B of the first resistor R1. The wireless power reception device 20 may have a configuration in which the terminal R2B is connected to the terminal B2P separately from the terminal R1B.

In the transmission line connecting the capacitor C32 and the second resistor R2, a junction point P4 is provided between the capacitor C32 and the second resistor R2. In the wireless power reception device 20, the junction point P4 is connected to the signal input terminal LF2I of the low-pass filter LF2 by a transmission line. In the wireless power reception device 20, the signal output terminal LF2O of the low-pass filter LF2 is connected to the signal input terminal DAI2 of the differential amplifier circuit DA by a transmission line. The low-pass filter LF2 is a filter that removes high-frequency noise of an electrical signal which is transmitted from the power receiving coil L2 via the transmission line LN2. The junction point P4 is an example of a second junction point.

In the wireless power reception device 20, the signal output terminal DAO of the differential amplifier circuit DA is connected to the signal input terminal PHI of the peak holding circuit PH by a transmission line. In the wireless power reception device 20, the signal output terminal PHO of the peak holding circuit PH is connected to the signal input terminal API of the amplifier AP.

In the wireless power reception device 20, the signal output terminal APO of the amplifier AP is connected to the signal input terminal PDI of the position detecting circuit PD by a transmission line. The signal output terminal PDO of the position detecting circuit PD is connected to a signal input terminal (not illustrated) of the control circuit 23. The signal output terminal PDO of the position detecting circuit PD may be connected to a signal input terminal of the ECU of the electric vehicle EV instead of the signal input terminal of the control circuit 23 or may be connected to the signal input terminal of the ECU of the electric vehicle EV in addition to the signal input terminal of the control circuit 23.

In the wireless power, reception device 20 the differential amplifier circuit DA, the peak holding circuit PH, and the position detecting circuit PD are connected in parallel to the power supply B1 by a transmission line. Specifically, the terminal B1N of the power supply B1, the power supply terminal DAN of the differential amplifier circuit DA, the power supply terminal PHN of the peak holding circuit PH, and the power supply terminal PDN of the position detecting circuit PD are connected to each other by a transmission line LN3. The terminal B1P of the power supply B1, the power supply terminal DAP of the differential amplifier circuit DA, the power supply terminal PHP of the peak holding circuit PH, and the power supply terminal PDP of the position detecting circuit PD are connected to each other by a transmission line LN4. Here, the power supply B1 may be any power supply (or any power supply circuit) as long as it is a DC power source (or a DC power supply circuit) of a source voltage which is higher than the source voltage of the power supply B2. In the following description, it is assumed that the source voltage of the power supply B1 is 5 V. That is, the reference potential is a midpoint potential of the source voltage. The source voltage of the power supply B1 may be a voltage lower than 5 V or may be a voltage higher than 5 V.

In the transmission line LN3, six junction points P7 to P12 are provided sequentially from the position detecting circuit PD to the power supply B1. In the transmission line LN4, five junction points P13 to P17 are provided sequentially from the position detecting circuit PD to the power supply B1.

The junction point P7 is a junction point between the power supply terminal PHN of the peak holding circuit PH and the transmission line LN3. The junction point P13 is a junction point between the power supply terminal PHP of the peak holding circuit PH and the transmission line LN4.

The junction point P8 is a junction point between the power supply terminal DAN of the differential amplifier circuit DA and the transmission line LN3. The junction point P14 is a junction point between the power supply terminal DAP of the differential amplifier circuit DA and the transmission line LN4.

In the wireless power reception device 20, the diode D11 is connected between a junction point P5 provided in the transmission line connecting the junction point P3 and the signal input terminal LF1I of the low-pass filter LF1 and the junction point P9 by a transmission line. In the wireless power reception device 20, the diode D12 is connected between, the junction point P5 and the junction point P15 by a transmission line. One or both of the diode D11 and the diode D12 are an example of a first diode.

In the wireless power reception device 20, the diode D21 is connected between junction point P6 provided in the transmission line connecting the junction point P4 and the signal input terminal LF2I of the low-pass filter LF2 and the junction point P10 by a transmission line. In the wireless power reception device 20, the diode D22 is connected between the junction point P6 and the junction point P16 by a transmission line. One or both of the diode D21 and the diode D22 are an example of a second diode.

In the wireless power reception device 20, the capacitor C4 is connected, between the junction point P11 and the junction point P17 by a transmission line. The capacitor C4 is a bypass capacitor.

In the wireless power reception device 20, the terminal B2N of the power supply B2 is connected to the junction point P12 by a transmission line.

The elements in the first circuit 22A and the second circuit 22B are connected in this way. The elements in the first circuit 22A and the second circuit 22B may be connected in another connection pattern in which the first circuit 22A and the second circuit 22B function correctly instead of the connection pattern illustrated in FIG. 2.

In the connection pattern illustrated in FIG. 2, the differential amplifier circuit DA, the peak holding circuit PH, and the position detecting circuit PD operate with at least one of a DC voltage supplied from the power supply B1 and a DC voltage supplied from the capacitor C4.

The configurations and the operations of the elements of the first circuit 22A and the second circuit 22B will be described below.

The first rectifier circuit RT1 rectifies an AC voltage received by the power receiving coil L2 and converts the voltage into a pulsating voltage. For example, the first rectifier circuit RT1 may be a half-wave rectifier circuit including one switching element, a half-wave rectifier circuit including one diode, a full-wave rectifier circuit including four switching elements or four diodes which are bridge-connected, or another rectifier circuit that rectifies an AC voltage supplied from the power receiving coil L2 and converts the voltage into a pulsating voltage. The pulsating voltage rectified by the first rectifier circuit RT1 is smoothed into a DC voltage by the capacitor C2. That is, the first rectification and smoothing circuit RT01 rectifies an AC voltage supplied from the power receiving coil L2 and converts the AC voltage into a DC voltage. In the example illustrated in FIG. 2, the first rectification and smoothing circuit RT01 is connected to the load Vload. When, the first rectification and smoothing circuit RT01 is connected to the load Vload, the first rectification and smoothing circuit RT01 supplies the converted DC voltage to the load Vload.

Here, when power which is transmitted from the power transmitting coil unit 13 to the power receiving coil unit 21 is normal power, the first rectification and smoothing circuit RT01 converts an AC voltage supplied from the power receiving coil L2 into a DC voltage and supplies the converted DC voltage to the load Vload. On the other hand, when power which is transmitted from the power transmitting coil unit 13 to the power receiving coil unit 21 is weak power, the first rectification and smoothing circuit RT01 does not supply a weak voltage supplied from the power receiving coil L2 to the load when a peak value of the weak voltage is lower than the potential of a junction point P21. Here, the junction point P21 is junction point between the transmission line connecting the output terminal RT1P of the first rectifier circuit RT1 and the power supply terminal VP of the load Vload and the terminal C2A of the capacitor C2.

When the power which is transmitted from the power transmitting coil unit 13 to the power receiving coil unit 21 is weak power, a peak value (a crest value) of an AC voltage (a weak voltage) supplied from the power receiving coil L2 via the transmission line LN1 is lower than the potential of the junction point P15 which is a potential including a forward voltage of the diode D12. Accordingly, in this case, the electrical signal is input to the differential amplifier circuit DA via the low-pass filter LF1. In this case, a peak value (a crest value) of an AC voltage, (a weak voltage) supplied from the power receiving coil L2 via the transmission line LN2 is lower than the potential of the junction point P16 including a forward voltage of the diode D22. Accordingly, in this case, the electrical signal is input to the differential amplifier circuit DA via the low-pass filter LF2. Then, the differential amplifier circuit DA differentially amplifies the potentials of the junction point P3 and the junction point P4 on the basis of the electrical signals input from the low-pass filter LF1 and the low-pass filter LF2. At this time, the differential amplifier circuit DA can accurately perform differential amplification of the potential by removing high-frequency noise using the low-pass filter LF1 and the low-pass filter LF2. The wireless power reception device 20 may not include the low-pass filter LF1 and the low-pass filter LF2.

The differential amplifier circuit DA outputs an electrical signal corresponding to the differentially amplified potential to the peak holding circuit PH. Accordingly, the wireless power reception device 20 can reduce low-frequency noise which cannot be removed by the low-pass filter LF1 and the low-pass filter LF2.

The peak holding circuit PH holds a peak value (a crest value) of a voltage waveform of an electrical signal output from the differential amplifier circuit DA. The peak holding circuit PH outputs an electrical signal indicating the held peak value to the amplifier AP. Here, the peak value varies (for example, is proportional to) depending on the magnitude of the peak value of the weak voltage supplied from the power receiving coil L2 and has a maximum value when the position of the power receiving coil L2 relative to the power transmitting coil L1 matches a predetermined position. By using a relationship between the peak value and the position of the power receiving coil L2 relative to the power transmitting coil L1, the position detecting circuit PD can detect the position of the power receiving coil L2 relative to the power transmitting coil L1 on the basis of the peak value indicated by the electrical signal output from the peak holding circuit PH. Since the wireless power reception device 20 includes the peak holding circuit PH, the wireless power reception device 20 can enhance accuracy for detecting the position of the power receiving coil L2 relative to the power transmitting coil L1 in comparison with a case in which it does not include the peak holding circuit PH.

The amplifier AP amplifies an electrical signal output from the peak holding circuit PH to an electrical signal with a predetermined level. For example, the amplifier AP is constituted by an operational amplifier. The amplifier AP outputs the amplified electrical signal to the position detecting circuit PD.

The position detecting circuit PD detects the position of the power receiving coil L2 relative to the power transmitting coil L1 on the basis of the peak value of the electrical signal output from the peak holding circuit PH. The position detecting circuit PD outputs an electrical signal indicating the detected position to the control circuit 23. Accordingly, the wireless power reception device 20 can determine whether the position of the power receiving coil relative to the power transmitting coil has matched a predetermined position. As a result, the wireless power reception device 20 can inform (notify) a user that the position of the power receiving coil relative to the power transmitting coil has matched the predetermined position. As illustrated in FIG. 2, the wireless power reception device 20 does not include a voltage divider circuit. Accordingly, the wireless power reception device 20 can detect the position of the power receiving coil relative to the power transmitting coil while curbing an increase in power loss in comparison with a case in which it includes a voltage divider circuit.

The diode D11 and the diode D12 clamp the potential of the junction point P3 to the voltage range of the power supply B1. Here, when power which is transmitted from the power transmitting coil unit 13 to the power receiving coil unit 21 is normal power, the potential of the junction point P3 is likely to change over the voltage range of the power supply B1 due to a voltage supplied from the power receiving coil L2 via the transmission line LN1. The diode D11 and the diode D12 clamp a potential over the voltage range and causes a current to flow from the junction point P5 to the capacitor C4. As a result, the potential of the junction point P3 is limited within the voltage range of the power supply B1.

The diode D21 and the diode D22 clamp the potential of the junction point P4 to the voltage range of the power supply B1. Here, when the power which is transmitted from the power transmitting coil unit 13 to the power receiving coil unit 21 is normal power, the potential of the junction point P4 is likely to change over the voltage range of the power supply B1 due to a voltage supplied from the power receiving coil L2 via the transmission line LN2. The diode D21 and the diode D22 clamp a potential over the voltage range and causes a current to flow from the junction point P6 to the capacitor C4. As a result, the potential of the junction point P4 is limited within the voltage range of the power supply B1.

In this way, when the position detecting circuit PD detects the position of the power receiving coil L2 relative to the power transmitting coil L1, the diode D11, the diode D12, the diode D21, and the diode D22 clamp the potential of the junction point P3 to the voltage range of the power supply B1 due to the potential higher than the maximum potential which is applied to the junction point P3 and clamp the potential of the junction point P4 to the voltage range of the power supply B1 due to the potential higher than the maximum potential which is applied to the junction point P4. Accordingly, the wireless power reception device 20 can prevent the differential amplifier circuit DA frorm malfunctioning due to supply of excessive power and use the excessive power as regenerative power. As a result, the wireless power reception device 20 can satisfactorily curb an increase in power loss.

In the example illustrated in FIG. 2, the diode D11 and the diode D12 clamp the potential of the junction point P3 to the voltage range of the power supply B1 but may be configured to clamp the potential to a voltage range of at least one of the power supply B1, the power supply B2, and a power supply (or a power supply circuit) that supplies a voltage to the control circuit 23.

In the example illustrated in FIG. 2, the diode D21 and the diode D22 clamp the potential of the junction point P4 to the voltage range of the power supply B1, but may be configured to clamp the potential to a voltage range of at least one of the power supply B1, the power supply B2, and a power supply (or a power supply circuit) that supplies a voltage to the control circuit 23.

An amplification factor of the above-mentioned differential amplifier circuit DA may be variable. In this case, the differential amplifier circuit DA changes the amplification factor, for example, in response to a request from the control circuit 23. Accordingly, the wireless power reception device 20 can change the amplification factor of the differential amplifier circuit DA depending on a distance between the wireless power transmission device 10 and the wireless power reception device 20. The distance is represented by a position detected by the wireless power reception device 20, that is, a position of the power receiving coil L2 relative to the power transmitting coil L1. For example, the wireless power reception device 20 increases the amplification factor as the distance increases. Accordingly, the wireless power reception device 20 can enlarge a range in which the position of the power receiving coil L2 relative to the power transmitting coil L1 can be detected.

When the amplification factor of the differential amplifier circuit DA is variable and, for example, the potential output from the differential amplifier circuit DA is saturated, the differential amplifier circuit DA may be configured to decrease the amplification factor of the differential amplifier circuit DA. Accordingly, for example, as the wireless power reception device 20 approaches the wireless power transmission device 10, the wireless power reception device 20 can decrease sensitivity associated with detection of the position of the power receiving coil L2 relative to the power transmitting coil L1 and accurately determine whether the position has matched a predetermined position. Here, the saturation of the potential output from the differential amplifier circuit DA means a state in which the magnitude of the potential output from the differential amplifier circuit DA does not increase even when the potentials of the junction point P3 and the junction point P4 increase.

When the amplification factor of the differential amplifier circuit DA is variable, for example, the differential amplifier circuit DA may be configured to set an initial value of the amplification factor to a maximum value of the amplification factor of the differential amplifier circuit DA. Accordingly, when the wireless power reception device 20 starts approaching the wireless power transmission device 10, the wireless power reception device 20 can maximize the range in which the position of the power receiving coil L2 relative to the power transmitting coil L1 can be detected.

When the amplification factor of the differential amplifier circuit DA is variable, the differential amplifier circuit DA may be configured to change the amplification factor in response to a request from another circuit such as the ECU of the electric vehicle EV. In this case, when the potential output from the differential amplifier circuit DA is saturated, the differential amplifier circuit DA may be configured to decrease the amplification factor of the differential amplifier circuit DA.

Here, a method of setting the amplitude of an AC voltage input to the differential amplifier circuit DA to be variable can be used as the method of setting the amplification factor of the differential amplifier circuit DA to be variable. This method is, for example, a method of providing switches of the capacitor C31 and the capacitor C32 in a stage previous to the differential amplifier circuit DA, switching ON/OFF of the switches using the control circuit, and changing the total value of capacitances of the capacitor C31 and the capacitor C32.

The method of setting the amplification factor of the differential amplifier circuit DA to be variable may be, for example, a method of providing a plurality of resistors in the differential amplifier circuit DA, switching ON/OFF of switches of the plurality of resistors using the control circuit, and changing a combined resistance of the resistors of which the switch is switched to ON.

A method of setting the amplitude of an AC voltage input to the differential amplifier circuit DA to be variable, which is different from the above-mentioned method, can be used as the method of setting the amplification factor of the differential amplifier circuit DA to be variable. This method is, for example, a method of simulatively changing capacitances of the capacitor C31 and the capacitor C32 in the stage previous to the differential amplifier circuit DA using pulse width modulation (PWM) control which is performed by the control circuit.

The method of setting the amplification factor of the differential amplifier circuit DA to be variable may be, for example, a method of providing one variable power supply and one junction field effect transistor (JFET) in the differential amplifier circuit DA, controlling the voltage of the variable power supply using the control circuit, and changing a resistance of the JFET.

The capacitances of both the capacitor C31 and the capacitor C32 may be variable. In this case, the capacitor C31 and the capacitor C32 change their capacitances, for example, under the control of the control circuit. Accordingly, the wireless power reception device 20 can enlarge the range in which the position of the power receiving coil L2 relative to the power transmitting coil L1 can be detected.

The wireless power reception device 20 may not include the differential amplifier circuit DA. In this case, the position detecting circuit PD detects the position of the power receiving coil L2 relative to the power transmitting coil L1, for example, on the basis of a value corresponding to the potentials of the junction point P3 and the junction point P4. The value is, for example, a potential difference between the junction point P3 and the junction point P4.

The wireless power reception device 20 may not include the peak holding circuit PH. In this case, the wireless power reception device 20 may include another circuit that can detect a peak value (a crest value) of a voltage waveform of an electrical signal output from the differential amplifier circuit DA. The position detecting circuit PD detects the position of the power receiving coil L2 relative to the power transmitting coil L1 on the basis of a value output from the circuit.

As described above, the wireless power reception device according to this embodiment (the wireless power reception device 20 in this example) receives an AC power from the power transmitting coil (the power transmitting coil L1 in this example) of the wireless power transmission device (the wireless power transmission device 10 in this example). The wireless power reception device includes: a power receiving coil (the power receiving coil L2 in this example) that is magnetically coupled to the power transmitting coil; a first rectification and smoothing circuit (the first rectification and smoothing circuit RT01 in this example) that rectifies an AC voltage supplied from the power receiving coil and outputs the rectified AC voltage to a load; a first capacitor (the capacitor C31 in this example) that is connected to a first transmission line (the transmission line LN1 in this example) which is one of two transmission lines connecting the power receiving coil and the first rectification and smoothing circuit; a second capacitor (the capacitor C32 in this example) that is connected to a second transmission line (the transmission line LN2 in this example) other than the first transmission line of the two transmission lines; a first resistor (the first resistor R1 in this example) of which one terminal (the terminal R1A in this example) is connected to the first capacitor and the other terminal (the terminal R1B in this example) is supplied with a predetermined reference potential; a second resistor (the second resistor in this example) of which one terminal (the terminal R2A in this example) is connected to the second capacitor and the other terminal (the terminal R2B in this example) is supplied with the reference potential; and a position detecting circuit (the position detecting circuit PD in this example) that detects a position of the power receiving coil relative to the power transmitting coil on the basis of a potential of a first junction point (the junction point P3 in this example) which is a junction point between the first capacitor and the first resistor and a potential of a second junction point (the junction point P4 in this example) which is a junction point between the second capacitor and the second resistor. Accordingly, the wireless power reception device can match a position of a power receiving coil relative to a power transmitting coil with a desired position while curbing an increase in power loss.

The wireless power reception device further includes: a power supply circuit (the power supply B1, the power supply B2, or the power supply that supplies power to the control circuit 23 in this example); a first diode (at least one of the diode D11 and the diode D12 in this example) that is connected between the first junction point and the power supply circuit and clamps the potential of the first junction point to a voltage range of the power supply circuit; and a second diode (at least one of the diode D21 and the diode D22 in this example) that is connected between the second junction point and the power supply circuit and clamps the potential of the second junction point to the voltage range of the power supply circuit. When the position detecting circuit detects the position of the power receiving coil relative to the power transmitting coil, the first diode and the second diode clamp the potential of the first junction point to a voltage range of the power supply circuit using a potential higher than a maximum potential which is applied to the first junction point and clamp the potential of the second junction point to the voltage range of the power supply circuit using a potential higher than a maximum potential which is applied to the second junction point. Accordingly, the wireless power reception device 20 can more reliably curb an increase in power loss.

In the wireless power reception device, the power supply circuit is at least one of a circuit (the power supply B1 in this example) that supplies a voltage to the position detecting circuit, a circuit that supplies a voltage to a control circuit (the control circuit 23 in this example) of the wireless power reception device, and a circuit (the power supply B2 in this example) that applies the reference potential to a terminal (the terminal R1B in this example) opposite to the first capacitor side among terminals of the first resistor and applies the reference potential to a terminal (the terminal R2B in this example) opposite to the second capacitor side among terminals of the second resistor. Accordingly, the wireless power reception device 20 can drive a circuit which is supplied with power from at least one of these circuits using regenerative power and thus more reliably curb an increase in power loss.

In the wireless power reception device, the position detecting circuit includes: a differential amplifier circuit (the differential amplifier circuit DA in this example) that differentially amplifies the potentials of the first junction point and the second junction point; and a peak holding circuit (the peak holding circuit PH in this example) that holds a peak value of a voltage waveform of an electrical signal which is output from the differential amplifier circuit. Accordingly, the wireless power reception device can reduce low-frequency noise and enhance accuracy for detecting the position of the power receiving coil relative to the power transmitting coil.

In the wireless power reception device, an amplification factor of the differential amplifier circuit is variable. Accordingly, the wireless power reception device can enlarge the range in which the position of the power receiving coil relative to the power transmitting, coil can be detected.

In the wireless power reception device, the differential amplifier circuit decreases the amplification factor of the differential amplifier circuit when a potential output from the differential amplifier circuit is saturated. Accordingly, the wireless power reception device can accurately determine whether the position of the power receiving coil relative to the power transmitting coil has matched a predetermined position.

In the wireless power reception device, the initial value of the amplification factor of the differential amplifier circuit is a maximum value of the amplification factor of the differential amplifier circuit. Accordingly, the wireless power reception device can maximize the range in which the position of the power receiving coil relative to the power transmitting coil can be detected.

In the wireless power reception device, capacitances of the first capacitor and the second capacitor are variable. Accordingly, the wireless power reception device can enlarge the range in which the position of the power receiving coil relative to the power transmitting coil can be detected.

Modified Example of Embodiment

A modified example of the embodiment will be described below. In the modified example of the embodiment, the same elements as in the embodiment will be referred to by the same reference signs and description thereof will not be repeated.

Figure 3:
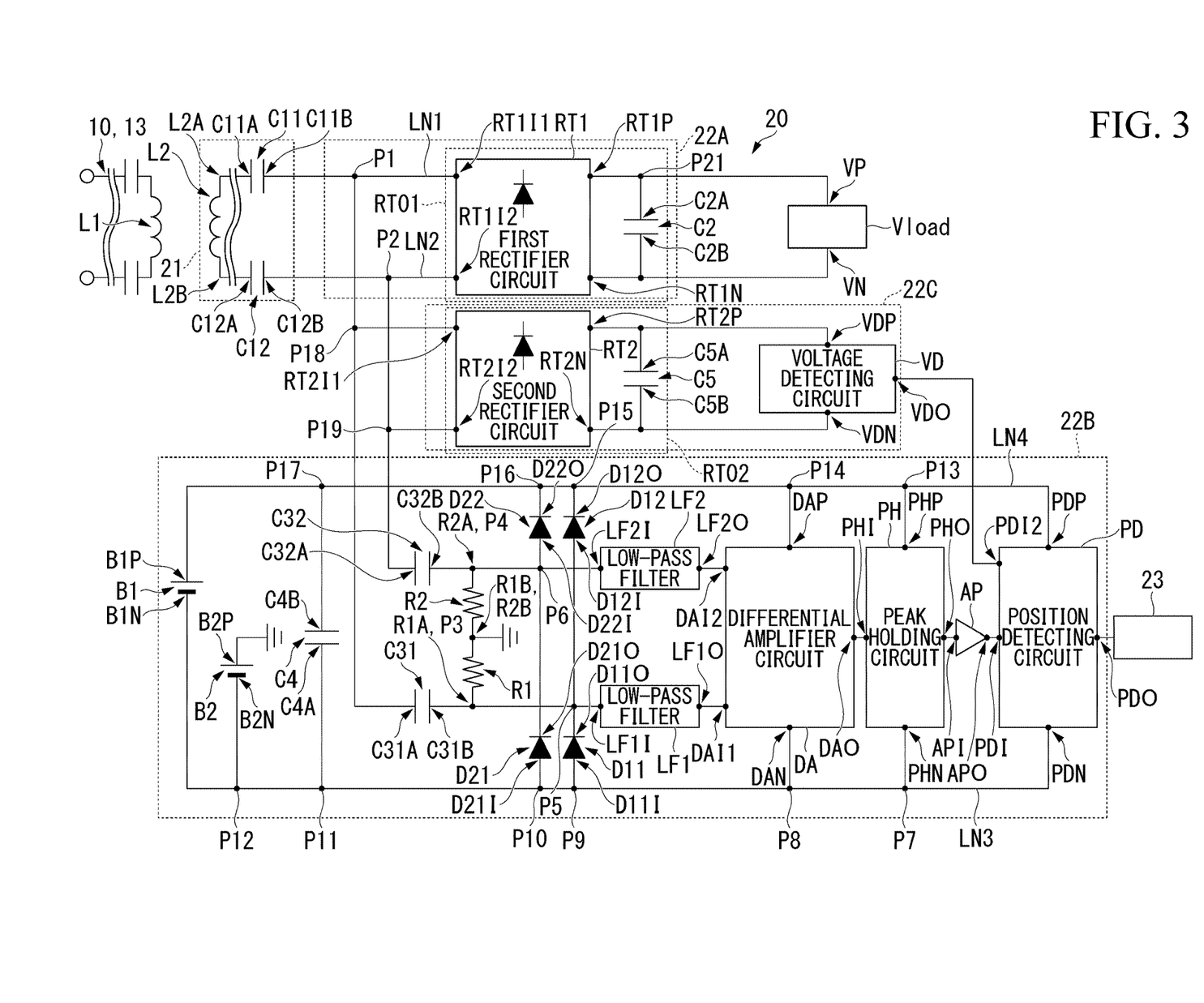
FIG. 3 is a diagram illustrating another example of the configuration of the wireless power reception device 20.

FIG. 3 is a diagram illustrating another example of the configuration of the wireless power reception device 20. As illustrated in FIG. 3, the wireless power reception device 20 according to the modified example of the embodiment includes a third circuit 22C in addition to the power receiving coil unit 21, the first circuit 22A, the second circuit 22B, and the control circuit 23.

The third circuit 22C along with the first circuit 22A and the second circuit 22B is connected in parallel to the power receiving coil unit 21 by a transmission line. The third circuit 22C is connected to the position detecting circuit PD by a transmission line. The third circuit 22C rectifies an AC voltage supplied to the transmission line LN1 and the transmission line LN2 into DC voltage. The third circuit 22C detects the rectified DC voltage. The third circuit 2C outputs an electrical signal indicating the detected voltage to the position detecting circuit PD.

The third circuit 22C includes a second rectifier circuit RT2 and a capacitor C5 as a second rectification and smoothing circuit RT02. The third circuit 22C also includes a voltage detecting circuit VD.

Here, the second rectifier circuit RT2 includes four terminals of an input terminal RT2I1, an input terminal RT2I2, a plus output terminal RT2P, and a minus output terminal RT2N. The voltage detecting circuit VD includes three terminals of a plus terminal VDP, a minus terminal VDN, and a signal output terminal VDO for outputting a signal. The capacitor C5 includes two terminals of a terminal C5A and a terminal C5B.

In the wireless power reception device 20 illustrated in FIG. 3, a junction point P18 is provided between the junction point P1 and the capacitor C31 in the transmission line connecting the junction point P1 and the capacitor C31. In the power receiving coil unit 21, a junction point P19 is provided between the junction point P2 and the capacitor C32 in the transmission line connecting the junction point P2 and the capacitor C32.

In the wireless power reception device 20 illustrated in FIG. 3, the first rectifier circuit RT1, the second rectifier circuit and the second circuit 22B are provided in parallel to each other. Specifically, in the wireless power reception device 20 the input terminal RT2I1 of the second rectifier circuit RT2 is connected to the junction point P18 by a transmission line. In the wireless power reception device 20, the input terminal RT2I2 of the second rectifier circuit RT2 is connected to the junction point P19 by a transmission line.

In the wireless power, reception device 20 illustrated in FIG. 3, the capacitor C5 and the voltage detecting circuit VD are connected in parallel to the second rectifier circuit RT2. Specifically, in the wireless power reception device 20, the output terminal RT2P of the second rectifier circuit RT2 is connected to the terminal C5A of the capacitor C5 and the terminal VDP of the voltage detecting circuit VD by a transmission line. In the wireless power reception device 20, the output terminal RT2N of the second rectifier circuit RT2 is connected to the terminal C5B of the capacitor C5 and the terminal VDN of the voltage detecting circuit VD by a transmission line.

In the wireless power reception device 20 illustrated in FIG. 3, the voltage detecting circuit VD is connected to the position detecting circuit PD by a transmission line. In this example, the position detecting circuit PD includes a signal input terminal PDI2 in addition to four terminals of the power supply terminal PDP, the power supply terminal PDN, the signal input terminal PDI, and the signal output terminal PDO. That is, the signal output terminal VDO of the voltage detecting circuit VD is connected to the signal input terminal PDI2 by a transmission line.

The second rectifier circuit RT2 rectifies an AC voltage supplied from the power receiving coil L2 and converts the voltage into a pulsating voltage. For example, the second rectifier circuit RT2 may be a half-wave rectifier circuit including one switching element, a half-wave rectifier circuit including one diode, a full-wave rectifier circuit including four switching elements or four diodes which are bridge-connected, or another rectifier circuit that rectifies an AC voltage supplied from the power receiving coil L2 and converts the voltage into a pulsating voltage. The pulsating voltage rectified by the second rectifier circuit RT2 is smoothed into a DC voltage by the capacitor C5. That is, the second rectification and smoothing circuit RT02 rectifies an AC voltage supplied from the power receiving coil L2 and converts the voltage into a DC voltage.

The voltage detecting circuit VD detects a DC voltage which is applied between the output terminal RT2P and the output terminal RT2N of the second rectifier circuit RT2. The voltage detecting circuit VD outputs an electrical signal indicating the detected DC voltage to the position detecting circuit PD. When the power which is transmitted from the power transmitting coil unit 13 to the power receiving coil unit 21 is weak power, the magnitude of the DC voltage varies (for example, is proportional to) depending on the magnitude of the peak value of the weak voltage supplied from the power receiving, coil L2 and has a maximum value when the position of the power receiving coil L2 relative to the power transmitting coil L1 matches a predetermined position. By using a relationship between the peak value and the position of the power receiving coil L2 relative to the power transmitting coil L1, the position detecting circuit PD can detect the position of the power receiving coil L2 relative to the power transmitting coil L1 on the basis of the DC voltage indicated by the electrical signal output from the voltage detecting circuit VD.

The position detecting circuit PD according to the modified example of the embodiment detects the position of the power receiving coil relative to the power transmitting coil on the basis of one or both of the peak value indicated by the electrical signal output from the amplifier AP and the DC voltage indicated by the electrical signal output from the voltage detecting circuit VD. For example, the position detecting circuit PD outputs information indicating the position indicating that the power receiving coil L2 and the power transmitting coil L1 are closer to each other out of the position detected on the basis of the peak value and the position detected on the basis of the DC voltage to another circuit. Accordingly, the wireless power reception, device 20 can enhance accuracy for detecting the position of the power receiving coil L2 relative to the power transmitting coil L1 without requiring a switch with a high capacity for the first rectification and smoothing circuit RT01.

As described above, the wireless power reception device (the wireless power reception device 20 in this example) according to the modified example of the embodiment includes: a second rectification and smoothing circuit (the second rectification and smoothing circuit RT02 in this example) that is provided in parallel to the first rectification and smoothing circuit (the first rectification and smoothing circuit RT01 in this example) between the first transmission line (the transmission line LN1 in this example) and the second transmission line (the transmission line LN2 in this example) and rectifies an AC voltage supplied from the power receiving coil (the power receiving coil L2 in this example); and a voltage detecting circuit (the voltage detecting circuit VD in this example) that detects a voltage output from the second rectification and smoothing circuit. The position detecting circuit (the position detecting circuit PD in this example) detects the position of the power receiving coil relative to the power transmitting coil (the power transmitting coil L1 in this example) on the basis of the voltage detected by the voltage detecting circuit when a potential output from the differential amplifier circuit (the differential amplifier circuit DA in this example) is saturated. Accordingly, the wireless power reception device can enhance accuracy for detecting the position of the power receiving coil relative to the power transmitting coil without requiring a switch with a high capacity for the first rectification and smoothing circuit.

While an embodiment of the invention has been described above in detail with reference to the drawings, the specific elements of the invention is not limited to the embodiment and may be changed replaced, deleted, or the like without departing from the gist of the invention.

EXPLANATION OF REFERENCES

1 Wireless power transmission system
10 Wireless power transmission device
11 Conversion circuit
12 Power transmitting circuit
13 Power transmitting coil unit
20 Wireless power reception device
21 Power receiving coil unit
22A First circuit
22B Second circuit
22C Third circuit
23 Control circuit
AP Amplifier
B1 Power supply
B2 Power supply
C11, C12, C2, C31, C32, C4, C5 Capacitor
D11, D12, D21, D22 Diode
DA Differential amplifier circuit
EV Electric vehicle
G Ground surface
L1 Power transmitting coil
L2 Power receiving
LF1, LF2 Low-pass filter
LN1, LN2, LN3, LN4 Transmission line
P Commercial power supply
P1-P19, P21 Junction point
PD Position detecting circuit
PH Peak holding circuit
R1 First resistor
R2 Second resistor
RT01 First rectification and smoothing circuit
RT02 Second rectification and smoothing circuit
RT1 First rectifier circuit
RT2 Second rectifier circuit
VD Voltage detecting circuit
Vload Load

What is claimed is:

1. A wireless power reception device that receives AC power from a power transmitting coil of a wireless power transmission device, the wireless power reception device comprising:
   a power receiving coil that is magnetically coupled to the power transmitting coil;
   a first rectification and smoothing circuit that rectifies an AC voltage supplied from the power receiving, coil and outputs the rectified AC voltage to a load;
   a first capacitor that is connected to a first transmission line which is one of two transmission lines connecting the power receiving coil and the first rectification and smoothing circuit;
   a second capacitor that is connected to a second transmission line other than the first transmission line of the two transmission lines;
   a first resistor of which one terminal is connected to the first capacitor and the other terminal is supplied with a predetermined reference potential;
   a second resistor of which one terminal is connected to the second capacitor and the other terminal is supplied with the predetermined reference potential; and
   a position detecting circuit that detects a position of the power receiving coil relative to the power transmitting coil on the basis of a potential of a first junction point which is a junction point between the first capacitor and the first resistor and a potential of a second junction point which is a junction point between the second capacitor and the second resistor.

2. The wireless power reception device according to claim 1, further comprising:
   a power supply circuit;
   a first diode that is connected between the first junction point and the power supply circuit and clamps the potential of the first junction point to a voltage range of the power supply circuit; and
   a second diode that is connected between the second junction point and the power supply circuit and clamps the potential of the second junction point to the voltage range of the power supply circuit,
   wherein, when the position detecting circuit detects the position of the power receiving coil relative to the power transmitting coil, the first diode and the second diode clamp the potential of the first junction point to a voltage range of the power supply circuit using a potential higher than a maximum potential which is applied to the first junction point and clamp the potential of the second junction point to the voltage range of the power supply circuit using a potential higher than a maximum potential which is applied to the second junction point.

3. The wireless power reception device according to claim 2, wherein the power supply circuit, is at least one of a circuit that supplies a voltage to the position, detecting circuit, a circuit that supplies a voltage to a control circuit of the wireless power reception device, and a circuit that applies the predetermined reference potential to a terminal opposite to the first capacitor side among terminals of the first resistor and applies the reference potential to a terminal opposite to the second capacitor side among terminals of the second resistor.

4. The wireless power reception device according to claim 3, wherein the position detecting circuit includes:
   a differential amplifier circuit that differentially amplifies the potentials of the first junction point and the second junction point; and
   a peak holding circuit that holds a peak value of a voltage waveform of an electrical signal which is output from the differential amplifier circuit.

5. The wireless power reception device according to claim 4, wherein an amplification factor of the differential amplifier circuit is variable.

6. The wireless power reception device according to claim 5, wherein the differential amplifier circuit decreases the amplification factor of the differential amplifier circuit when a potential output from the differential amplifier circuit is saturated.

7. The wireless power reception device according to claim 6, wherein an initial value of the amplification factor of the differential amplifier circuit is a maximum value of the amplification factor of the differential amplifier circuit.

8. The wireless power reception device according to claim 4, further comprising:
   a second rectification and smoothing circuit that is provided in parallel to the first rectification and smoothing circuit between the first transmission line and the second transmission line and rectifies an AC voltage supplied from the power receiving coil; and
   a voltage detecting circuit that detects a voltage output from the second rectification and smoothing circuit,
   wherein the position detecting circuit detects the position of the power receiving coil relative to the power transmitting coil on the basis of the voltage detected by the voltage detecting circuit when a potential output from the differential amplifier circuit is saturated.

9. The wireless power reception device according to claim 2, wherein the position detecting circuit includes:
   a differential amplifier circuit that differentially amplifies the potentials of the first junction point and the second junction point; and
   a peak holding circuit that holds a peak value of a voltage waveform of an electrical signal which is output from the differential amplifier circuit.

10. The wireless power reception device according to claim 9, wherein an amplification factor of the differential amplifier circuit is variable.

11. The wireless power reception device according to claim 10, wherein the differential amplifier circuit decreases the amplification factor of the differential amplifier circuit when a potential output from the differential amplifier circuit is saturated.

12. The wireless power reception device according to claim 11, wherein an initial value of the amplification factor of the differential amplifier circuit is a maximum value of the amplification factor of the differential amplifier circuit.

13. The wireless power reception device according to claim 9, further comprising:
   a second rectification and smoothing circuit that is provided in parallel to the first rectification and smoothing circuit between the first transmission line and the second transmission line and rectifies an AC voltage supplied from the power receiving coil; and
   a voltage detecting circuit that detects a voltage output from the second rectification and smoothing circuit,
   wherein the position detecting circuit detects the position of the power receiving coil relative to the power transmitting coil on the basis of the voltage detected by the voltage detecting circuit when a potential output from the differential amplifier circuit is saturated.

14. The wireless power reception device according to claim 1, wherein the position detecting circuit includes:
   a differential amplifier circuit that differentially amplifies the potentials of the first junction point and the second junction point; and
   a peak holding circuit that holds a peak value of a voltage waveform of an electrical signal which is output from the differential amplifier circuit.

15. The wireless power reception device according to claim 14, wherein an amplification factor of the differential amplifier circuit is variable.

16. The wireless power reception device according to claim 15, wherein the differential amplifier circuit decreases the amplification factor of the differential amplifier circuit when a potential output from the differential amplifier circuit is saturated.

17. The wireless power reception device according to claim 16, wherein an initial value of the amplification factor of the differential amplifier circuit is a maximum value of the amplification factor of the differential amplifier circuit.

18. The wireless power reception device according to claim 14, further comprising:
   a second rectification and smoothing circuit that is provided in parallel to the first rectification and smoothing circuit between the first transmission line and the second transmission line and rectifies an AC voltage supplied from the power receiving coil; and
   a voltage detecting circuit that detects a voltage output from the second rectification and smoothing circuit,
   wherein the position detecting circuit detects the position of the power receiving coil relative to the power transmitting coil on the basis of the voltage detected by the voltage detecting circuit when a potential output from the differential amplifier circuit is saturated.

19. The wireless power reception device according to claim 1, wherein capacitances of the first capacitor and the second capacitor are variable.

20. A wireless power transmission system comprising:
   the wireless power reception device according to claim 1; and
   the wireless power transmission device.

* * * * *